APPARATUS FOR COLLECTING CIGARETTES
Filed Oct. 21, 1957 7 Sheets-Sheet 1
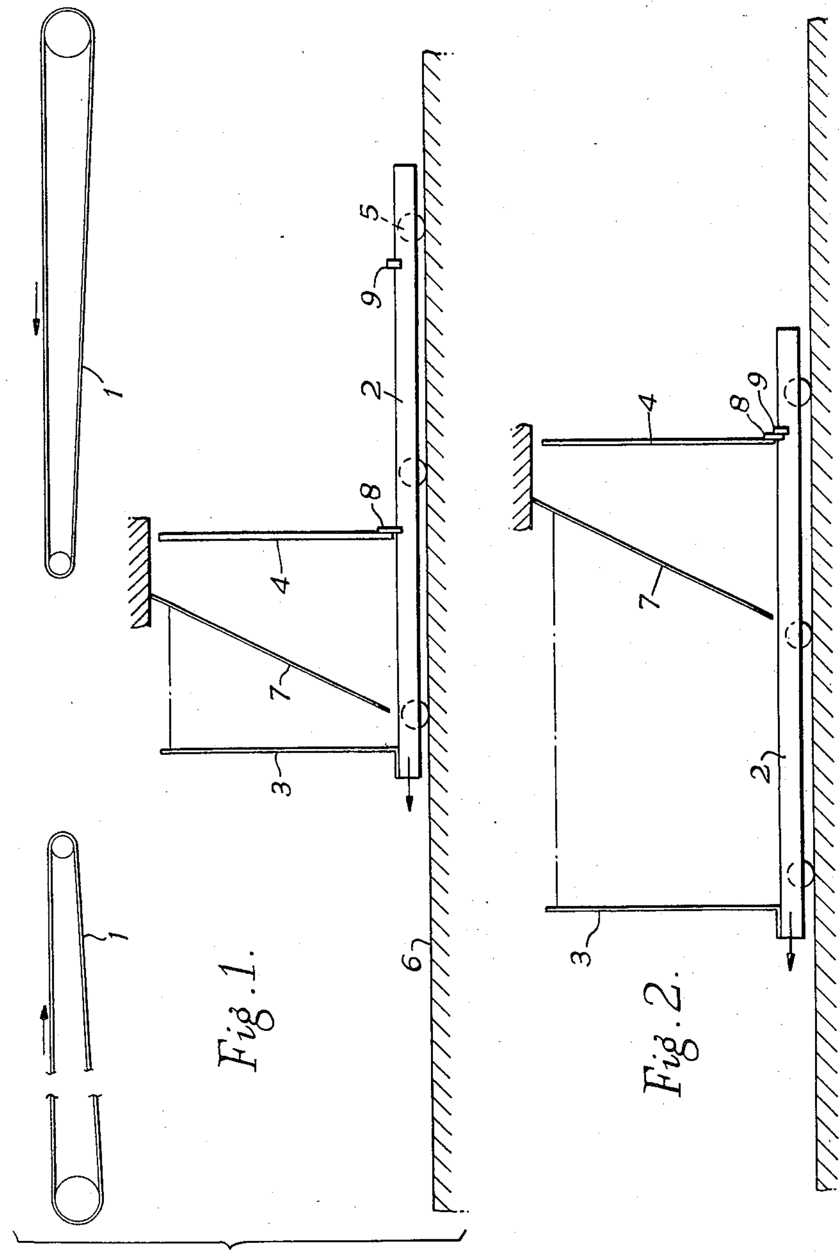
INVENTOR
George F. Pembroke
BY
Watson, Cole, Grindle & Watson
ATTORNEYS APPARATUS FOR COLLECTING CIGARETTES
Filed Oct. 21, 1957
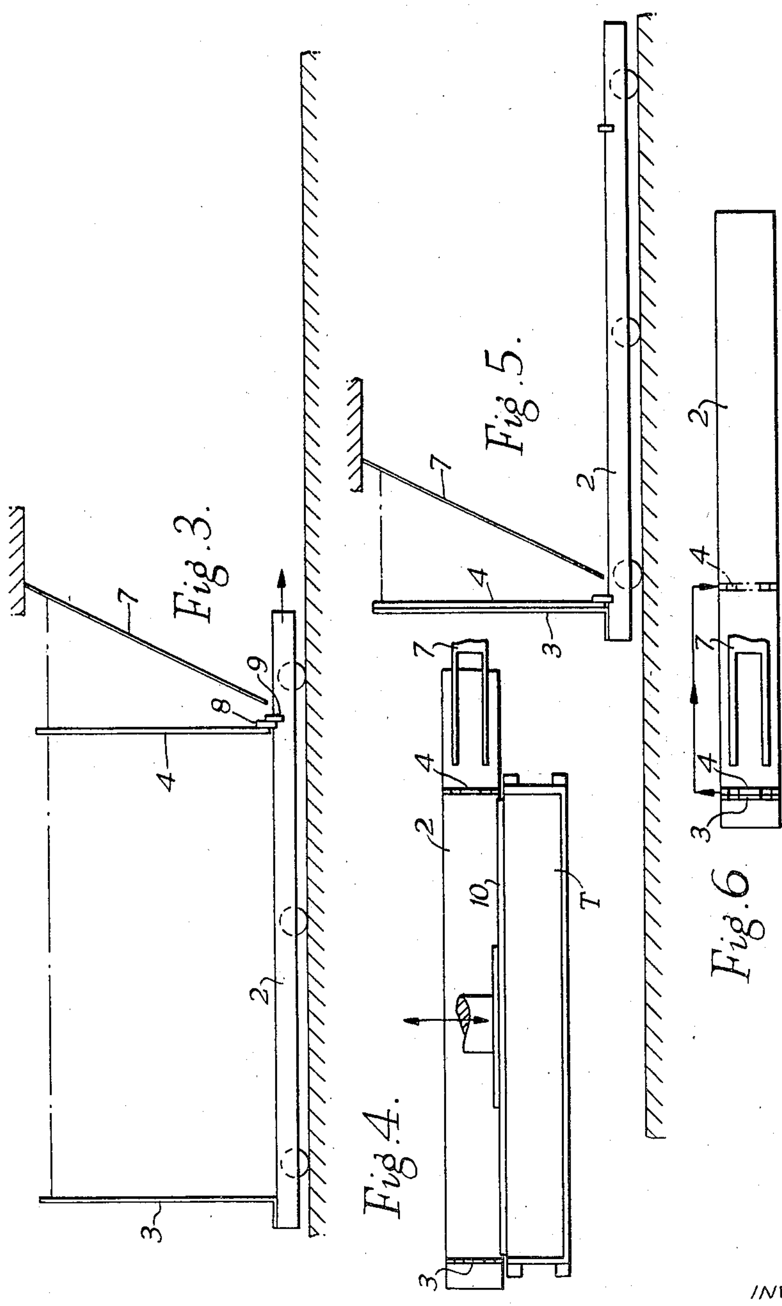
INVENTOR
George F. Pembroke
BY
Watson, Cole, Grindle & Watson
ATTORNEYS APPARATUS FOR COLLECTING CIGARETTES
Filed Oct. 21, 1957 7 Sheets-Sheet 3
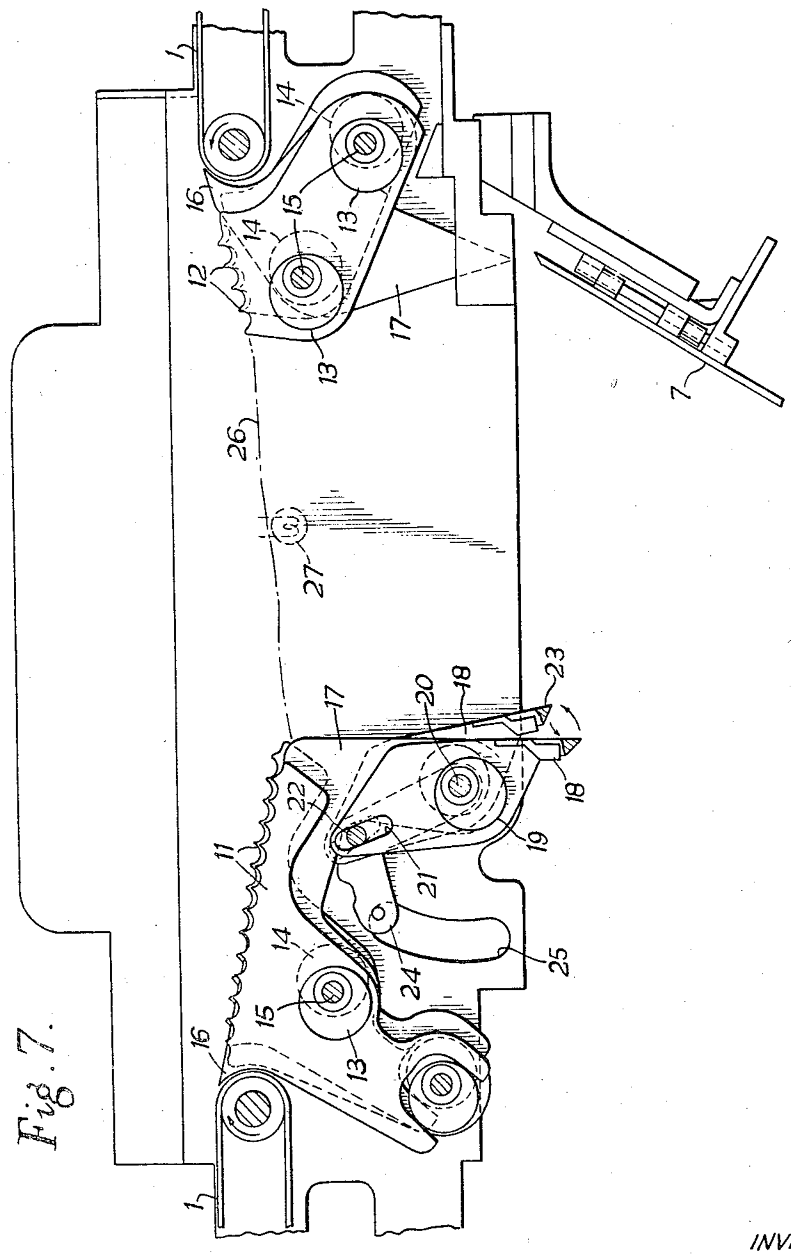
INVENTOR
George F. Pembroke
BY
Watson, Cole, Grindle & Watson
ATTORNEYS APPARATUS FOR COLLECTING CIGARETTES
Filed Oct. 21, 1957 7 Sheets-Sheet 4
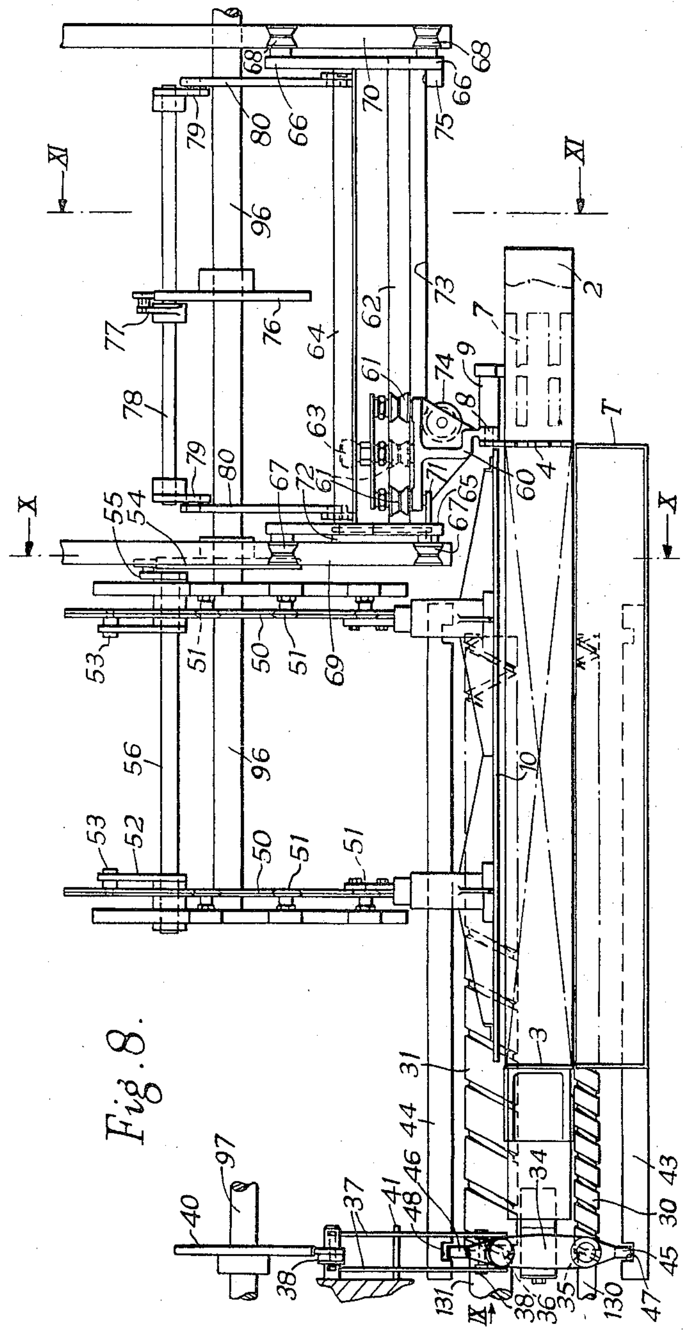
INVENTOR
George F. Pembroke
BY
Watson, Cole, Grindle & Watson
ATTORNEYS

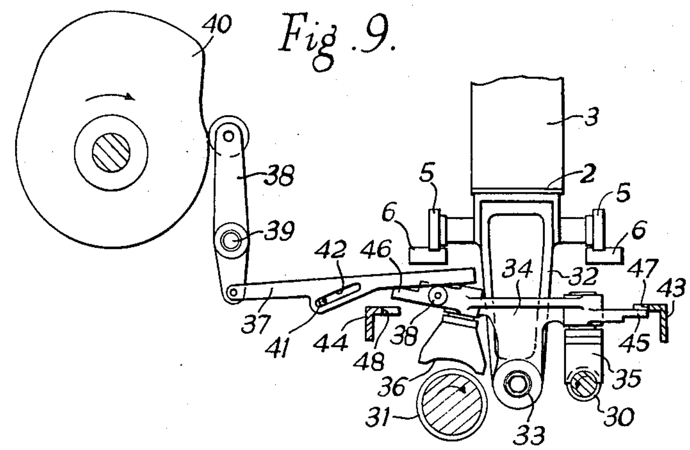
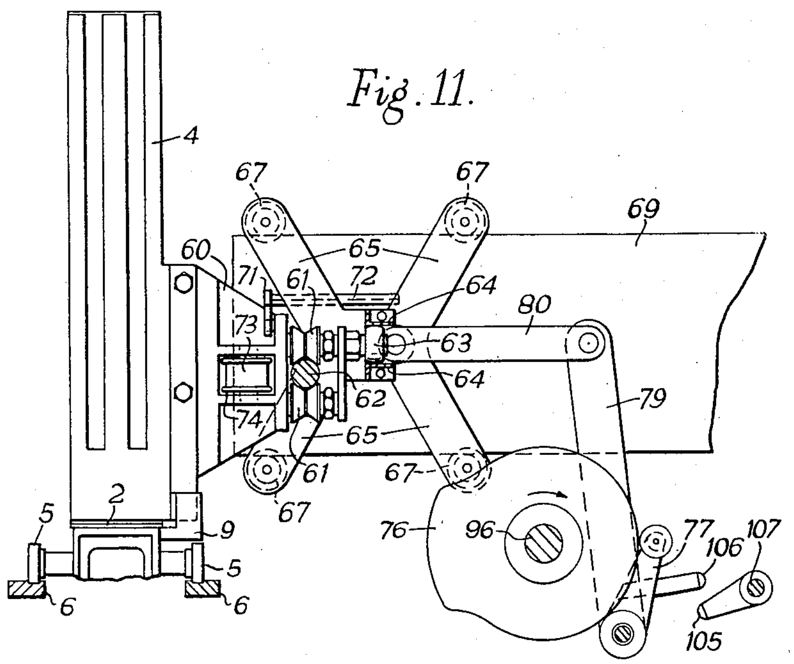
INVENTOR
George F. Pembroke
BY
Watson, Cole, Grindle & Watson
ATTORNEYS Feb. 23, 1960 G. F. PEMBROKE 2,925,697
APPARATUS FOR COLLECTING CIGARETTES
Filed Oct. 21, 1957 7 Sheets-Sheet 6
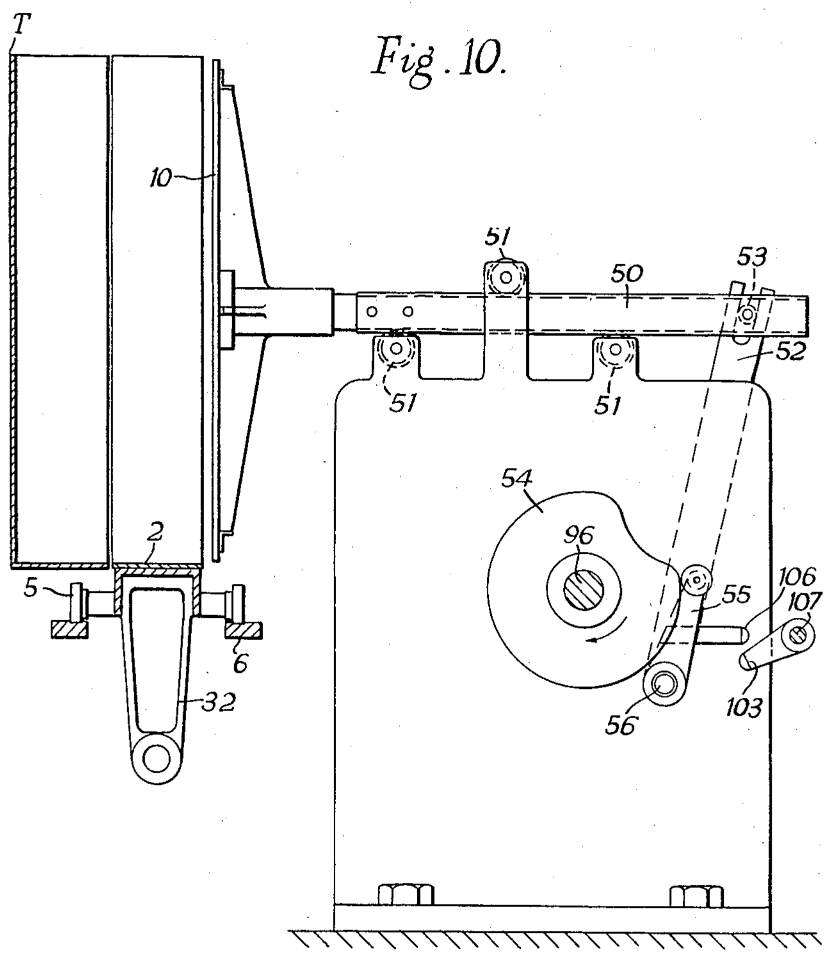
INVENTOR
George F. Pembroke
BY
Watson, Cole, Grindle & Watson
ATTORNEYS

Fig. 12.

INVENTOR
George F. Pembroke

BY
Watson, Cole, Grindle & Watson
ATTORNEYS

United States Patent Office 2,925,697

Patented Feb. 23, 1960

2,925,697

APPARATUS FOR COLLECTING CIGARETTES

George Frederick Pembroke, Deptford, London, England, assignor to Molins Machine Company Limited, London, England, a British company Application October 21, 1957, Serial No. 691,400

Claims priority, application Great Britain October 22, 1956

7 Claims. (Cl. 53—148)

This invention concerns improvements in or relating to apparatus for collecting cigarettes (e.g. cigarettes coming from a cigarette-making machine).

According to the invention there is provided apparatus for collecting cigarettes, in which a support having a front wall and a back wall is progressively loaded with cigarettes while moving forwardly past a downwardly extending guide for the cigarettes, wherein the rear wall during its forward movement can pass the guide while both are cooperating with the front wall to confine cigarettes, and wherein the rear wall is removable from the support and is also movable relatively to the front wall in a direction lengthwise of the support, so that when the rear wall has moved forward past the guide and the cigarettes confined between the front and rear walls have been removed from the support, the rear wall can be held stationary while the front wall is moved rearwardly close to the rear wall, and so that the rear wall can then be withdrawn from the support and replaced behind the guide.

In this way cigarettes can continue to move down towards the receptacle while the rear wall is passing the guide, so as to be contained between the guide and the rear wall when the front wall is in its most forward position, and when the front wall is then moved rearwardly and the rear wall withdrawn, the said cigarettes are then contained between the guide and the front wall, and loading of cigarettes on to the support can then proceed as before by moving the support forwardly.

The cigarettes may be removed from the support by pushing them bodily into a container which can then be removed.

Apparatus according to the invention will now be described by way of example with reference to the accompanying drawings, in which:

Figure 1 is a side elevation;

Figures 2 and 3 are similar views but illustrating different stages of operation;

Figure 4 is a plan view corresponding to Figure 3;

Figure 5 shows a further stage of operation;

Figure 6 is a plan view corresponding to Figure 5;

Figure 7 shows a collecting station for cigarettes;

Figure 8 is a plan view showing the operating mechanism;

Figure 9 is an end view in the direction of the arrow IX, Figure 8;

Figure 10 is a section on the line X—X, Figure 8;

Figure 11 is a section on the line XI—XI, Figure 8 and

Figure 12:
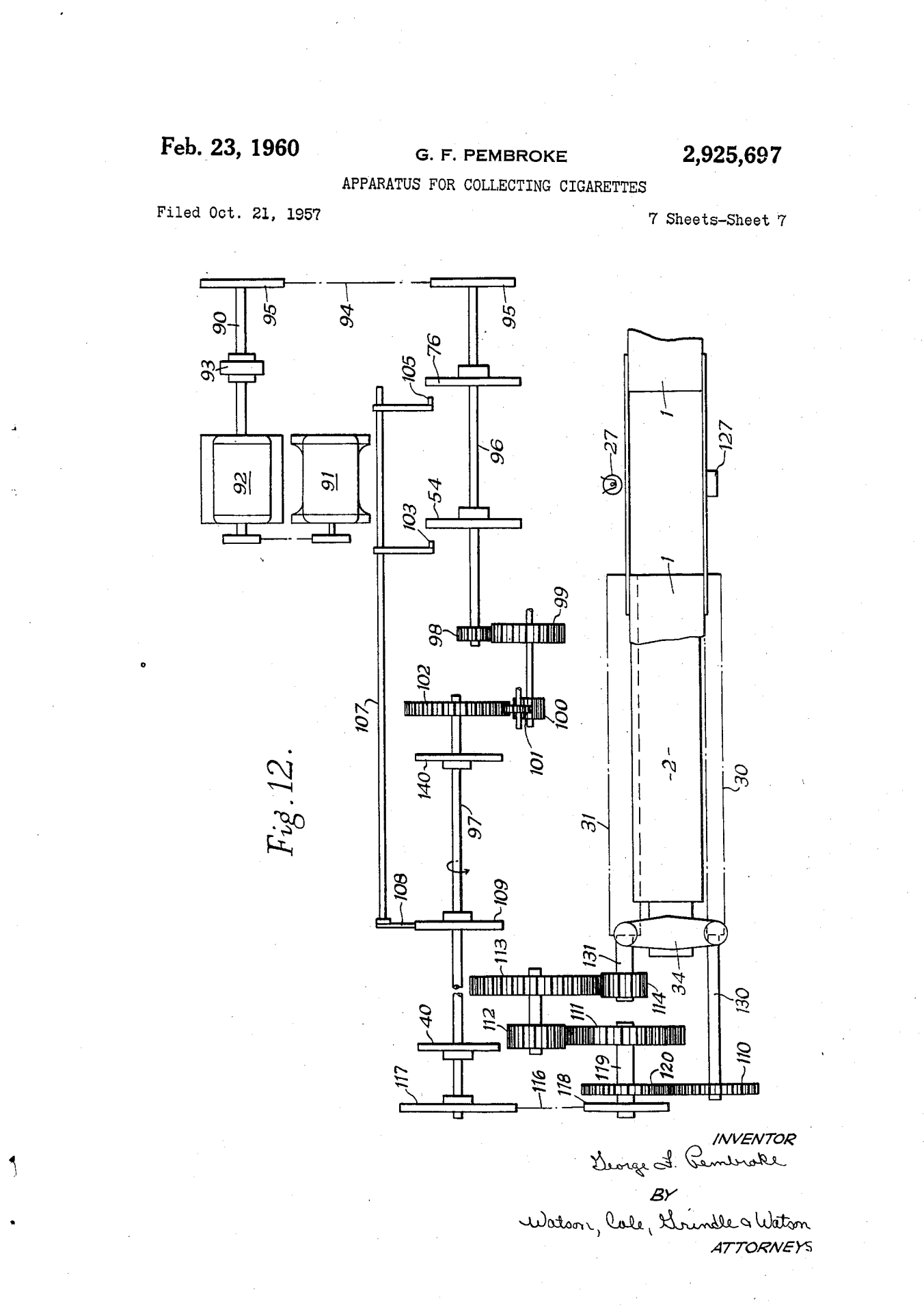

Figure 12 is a diagrammatic plan view showing the driving arrangements.

The apparatus and its mode of operation will first be briefly described with reference to Figures 1 to 6 of the drawings, which are schematic in character. The mechanism for operating the apparatus will then be more fully described with reference to Figures 7 to 12.

Referring first to Figure 1, two catcher bands 1 of two side-by-side cigarette-making machines are arranged to move in opposite directions as indicated by the arrows, so as to convey cigarettes towards a central collecting station. The cigarettes will, in the usual way, be conveyed sideways by the catcher bands, each of which will carry a single row of cigarettes. The collecting station to which cigarettes are delivered by the catcher bands is illustrated in Figure 7 and will be described later.

A trolley comprising a support 2, a fixed front wall 3, and a removable rear wall 4, is mounted on wheels 5 and arranged to be movable forwards and backwards along a track which comprises guides 6 for the wheels. the direction of forward movement of the support is indicated by an arrow. A fixed guide 7 extends downwardly towards the support and slopes forwardly. The purpose of the sloping guide is to guide cigarettes from the collecting station down on to the support.

The rear wall 4 is removable from the support 2, and is also movable relatively to the front wall and the support lengthwise of the latter, and can therefore be held stationary while the support moves lengthwise, but can also move with the support. For the latter purpose the rear wall is movably mounted as will be described later. An abutment 8 on the rear wall is engageable by an abutment 9 on the support when the latter is moved far enough forwardly, as illustrated in Figure 2.

As shown in Figures 4 and 6, the guide 7 is forked and the rear wall 4 is correspondingly slotted so as to enable the rear wall to pass the guide.

A pusher plate 10, Figure 4, is arranged to be movable across the support 2 between the front and rear walls when the trolley has reached a suitable position in which the rear wall is at its maximum distance from the front wall and is to the left of the guide 7 as viewed in Figures 1–6. A container in the form of a cigarette tray T, open at one side, is placed alongside the path of the trolley at this position so as to receive cigarettes pushed into it from the support 2 by the pusher plate 10. This tray T is one of a number of such trays which are thus filled with cigarettes in succession and removed.

The empty support 2 is then quickly returned to its original position, while the rear wall 4 remains stationary until the front wall 3 has moved up against it as shown in Figure 5. The rear wall 4 is then withdrawn sideways, moved rearwardly, and returned sideways to its original position, as indicated by the arrows in Figure 6, which also indicates in dot and dash lines the rearward position of the rear wall. The trolley then starts to move forwardly again and the filling cycle is repeated.

Referring now to Figure 7 adjacent the catcher bands 1 are sets of feeder bars 11 and 12, each set comprising a number of narrow bars, grooved on their upper surfaces, and arranged side by side, alternate and intermediate bars on each set being mounted on eccentrics 13 and 14 respectively. The eccentrics are on common shafts 15, and thus, as these shafts rotate, alternate bars move up while intermediate bars are moving down. Cigarettes lying in the grooves are therefore transferred from alternate to intermediate bars and are thus fed forwardly from the catcher bands 1. Guide plates 16 extend from between the feeder bars and bridge the gaps between the bars and the catcher bands. The guide plates 16 have downwardly-extending parts 17 which confine the mass of cigarettes fed downwardly from the feeder bars.

At the left hand side of Figure 7 are a number of oscillatory levelling members 18 which are carried on eccentrics 19 on a shaft 20, and are provided with slots 21. A fixed bar 22 passes through the slots so that as the shaft 20 rotates, the members 18 make oscillatory movements as indicated by the curved arrows. The members 18 are provided with rubber toes 23.

The levelling members 18 may be moved out of their operative position, to allow the front wall of the trolley to pass, by a device which causes them to be swung about the eccentric shaft 20 as a lever 24 is swung downwards in a slot 25.

The broken line 26 indicates the level at which cigarettes should be maintained in the collecting station. A lamp 27 at a side of the station directs a beam of light towards a photo-electric cell, which beam is normally masked by the cigarettes. If the cigarette level falls too low, the light beam reaches the cell and the subsequent energisation of the latter causes a clutch to be disengaged whereby the filling apparatus stops, as will be described later.

Referring now to Figure 8, this shows the support 2 in its extreme forward position, with the stop 9 on the support engaging the stop 8 on the back wall 4, and with the pusher 10 about to push a stack of cigarettes from the support into the tray T.

Figures 8 and 9 show the arrangements for reciprocating the support 2, which, as shown diagrammatically in Figure 1, is mounted on wheels 5 running on guides 6, which are also shown in Figure 9, but are omitted from Figure 8 since they would obscure other parts.

Two screws 30 and 31, arranged for rotation in opposite directions as shown by the arrows, Figure 9, are provided for moving the support forwardly and backwardly respectively. A member 32 depending downwardly from the support carries a pivot pin 33 on which is pivoted a swingable member 34, which carries at opposite ends two elements 35, 36 each of which can in turn be brought into engagement with the thread of the screw 30 or the screw 31, so as each in turn to act as a nut and be caused to travel along the screw which it engages. The screw 31 is of greater diameter and pitch than the screw 30, and rotates faster, so as to give the trolley a rapid return movement.

In order to transfer the drive from the screw 30 to the screw 31, in order to return the trolley, a double arm 37 is moved into engagement with a pair of rollers 38 on the member 34 when the trolley is at the end of its forward travel, as shown in Figures 8 and 9, and presses downwardly so as to rock the member 34 and thereby lift the element 35 away from the screw 30, and lower the element 36 on to the screw 31. The arm 37 is moved by a lever 38 pivoted at 39 and rocked by a cam 40, and its downward movement is caused by a fixed pin 41 projecting through slots 42 in the arm. Guide rails 43 and 44 are provided for the purpose of holding the elements 35 and 36 in engagement with the screws 30 and 31, in turn. A projection 45 on the member 34 engages and runs along the undersurface of the rail 43 while the trolley is moving forwardly, and when the trolley reaches its extreme forward position the projection 45 can move up through a recess 47 in the rail 43, while the projection 46 can move down through a similar recess 48 in the rail 44, when the member 34 is rocked and the element 35 disengages the screw 30, and the element 36 engages the screw 31. Thereafter, as the trolley moves rearwardly, the projection 46 runs along the underside of the rail 44.

An arrangement similar to that shown in Figures 8 and 9 is provided for rocking the member 34 when the trolley reaches the end of its return movement, but in that case an arm equivalent to the arm 37 is arranged to lift the roller 38 instead of lowering it.

Referring now to Figures 8 and 10, the pusher plate 10 is mounted on a pair of arms 50 which are movable back and forth in guides consisting of guide wheels 51 which fit in grooves in the arms 50. Two forked levers 52 engage rollers 53 on the arms 50, and are rocked by means of a cam 54 and a lever 55 mounted on a shaft 56 on which the levers 52 are fixed. The cam 54 is so shaped that the arms 50 (which are yieldingly urged forwardly in any suitable way) are held back for the greater part of a revolution of the cam, and can move forwardly in a pushing stroke at the appropriate time, so that the pusher plate 10 moves across the support 2 to transfer cigarettes therefrom into a tray T.

Referring now to Figures 8 and 11, the rear wall 4 is, as mentioned above, movable sideways as well as forwardly and backwardly. For this purpose the wall 4 and stop 8 are fixed on a carriage 60 which is provided with grooved wheels 61 arranged to run along a guide rod 62, and with a roller 63 which runs between guide rails 64. The rod 62 and rails 64 form part of a further carriage by which the carriage 60 can be moved sideways relatively to the path of the trolley. The guides 62 and 64 are fixed at opposite ends to arms 65, 66 which carry grooved wheels 67, 68 arranged to run along fixed guides 69, 70.

A latch 71 pivoted on the carriage 60 hooks on to an elongated catch 72 which is fixed on the guide 69, and thereby holds the carriage 60 against rearward movement (i.e. to the right, Figure 8) in which direction the carriage is urged by a flexible ribbon spring 73, which is coiled on a spool 74 fixed to the carriage 60, the other end being fixed to a block 75 on an arm 66. It will be seen that when the carriage 60 is moved sideways relatively to the path of the trolley, the latch 71 will eventually be moved clear of the catch 72, and the carriage will then be free to move rearwardly, that is to the right as viewed in Figure 8, under the influence of the spring 73. When the parts are in the positions shown in Figure 8, rearward movement of the carriage is in any case prevented by the stop 9 on the support 2, and it is not until the support 2 has moved to its extreme rearward position (i.e. to the right in Figure 8) that the carriage 60 will be moved sideways.

Sideways movement of the carriage 60 is effected by a cam 76 which swings a lever 77, fixed on a shaft 78, to which are also fixed arms 79 connected by links 80 to the guides 64. The carriage comprising the guides 62 and 64 and arms 65 and 66 is spring-urged towards the position in which it is shown in Figures 8 and 11, and the cam 76 is so shaped as to withdraw this carriage, and allow it to return, once during each revolution of the cam.

The mechanism which has been described with reference to Figures 8 to 11 operates in the following sequence.

When the parts are in the positions shown in Figure 8, the support 2 is at its most forward position and is fully loaded with cigarettes between the front wall 3 and the rear wall 4, and also between the rear wall 4 and the sloping guide 7, which is in part indicated by dot and dash lines in Figure 8. The pusher plate 10 then moves across the support and pushes into the tray T those cigarettes which are stacked between the front and rear walls of the trolley and then returns. Immediately thereafter, the arm 37, Figure 9, is moved downwardly by the cam 40 and lever 38, and rocks the member 34 so that the element 35, which has reached the end of the screw 30, rises from the latter, and the element 36 drops into driving engagement with the screw 31, whereby the support 2 is moved rearwardly.

During this rearward movement, the stop 9 moves away from the stop 8, but the rear wall is held against movement by the latch 71 and catch 72. The support 2 continues to move back until the front wall 3 is against the rear wall 4.

The arms 79 are then swung by the cam 76 so as to pull the guides 62 and 64, and thereby the carriage 60 and rear wall 4, sideways away from the support 2, until the latch 71 has been moved clear of the catch 72. Immediately this occurs, the carriage 60, under the influence of the spring 73, moves rearwardly. The guides 62 and 64, together with the carriage 60, are then moved bodily towards the support 2, so as to bring the rear wall 4 into position over the support 2 a suitable distance behind the sloping guide 7.

At this stage the cigarettes which were originally contained between the guide 7 and rear wall 4 are now between the guide 7 and the front wall 3, and the support 2 can again move forwardly. This is accomplished by rocking the member 34 so as to engage the feed screw 30 and disengage the element 36 from the return screw 31. The rear wall 4 remains motionless, under the influence of the spring 73, until the support 2 has moved far enough forward for the stop 9 to engage the stop 8 and thereby push the rear wall 4, and carriage 60, forwardly with the support. This forward movement of the rear wall continues while the rear wall passes the sloping guide 7, and as the support 2 reaches its most forward position, the latch 71 engages the catch 72 and locks the carriage 60 and rear wall 4 in position. This completes the cycle of operations.

The driving arrangements are shown schematically in Figure 12.

A shaft 90 is driven by an electric motor 91 through reduction gearing in a gear box 92 and through a clutch 93. The drive is transmitted by a chain 94 and sprockets 95 to a shaft 96 on which are fixed the cams 54 and 76.

It will be appreciated that the forward feed of the trolley must necessarily be slow in order to allow it to be loaded with cigarettes from the collecting station. The operation of the pusher 10 and the displacement of the rear wall 4, on the other hand, require to be effected reasonably quickly, but in exact timed relationship with the movement of the trolley. Accordingly it is required that the cams 54 and 76 should rotate relatively fast but in timed relationship with the slow-rotating cam 40 which controls the change-over from forward to rearward feed of the trolley, and the corresponding cam, shown as 140 in Figure 12, which actuates the forward feed.

Accordingly the cams 40 and 140 are mounted on a shaft 97 which is driven, through a train of gears 98 to 102, from the shaft 96, at one-sixth the speed of the shaft 96. Thus the cams 54 and 76 rotate through six revolutions for each complete cycle of operations. During five of these revolutions the pusher 10 is held against forward movement by a catch 103, Figures 10 and 12, engaging a projection 104 on the lever 55, Figure 10. Similarly a catch 105 engages a projection 106 on the lever 77, Figure 11, to prevent sideways movement of the rear wall 4 during five revolutions of the cam 76. The catches 103 and 105 are fixed on a rock-shaft 107, which is rocked by an arm 108 which is displaced by a cam 109 on the shaft 97 once during each revolution of the latter. Thus the catches 103 and 105 are moved away from the projections 104 and 106 once during every six revolutions of the cams 54 and 76, that is, once during each complete cycle of operations.

The feed screw 30 is driven from the shaft 97 by a chain 116 and sprockets 117 and 118, the latter being fixed on a shaft 119 which also carries a gear 120 meshing with a gear 110 on a shaft 130 extending from the screw 30. The return screw 31 is driven, at a much greater speed than the screw 30, from the shaft 119 through a train of gears 111, 112, 113 and 114, the last mentioned gear being fixed on a shaft 131 extending from the screw 31.

As was mentioned in connection with Figure 7, a lamp 27 and a photo-electric cell are provided at the collecting station to regulate the operation of the apparatus according to the level of cigarettes in the collecting station. The lamp 27 and a photo-electric cell 127 are diagrammatically shown in Figure 12. The cell 127 is connected in any suitable way to the clutch 93 so as to disengage the clutch, and thereby bring the whole drive to a standstill, as soon as the cell is energised, and to re-engage the clutch when the level of the cigarettes rises again sufficiently to obscure the light beam.

What I claim as my invention and desire to secure by Letters Patent is:

1. In apparatus for collecting cigarettes, a movable support, a front wall associated with said support, a fixed guide extending downwardly toward said support, means to move said support and front wall forwardly, means to feed cigarettes on to said support to be confined between the guide and the front wall while the front wall is moving forwardly away from the guide, whereby the support is progressively loaded with cigarettes, a rear wall associated with the support and movable forwardly therewith and so shaped that it can pass the guide while moving forwardly, means operative when the rear wall has passed the guide to remove from the support cigarettes confined between the front wall and rear wall, means to hold the rear wall stationary in front of the guide after the said cigarettes have been removed, means operative while the rear wall is held stationary to move the front wall rearwardly close to the rear wall, and means to move the rear wall laterally away from the front wall for replacement behind the guide.

2. Apparatus as claimed in claim 1, wherein the said means to move the front wall rearwardly is also operative, while the rear wall is held stationary, to move the said support rearwardly with the front wall.

3. Apparatus as claimed in claim 2, comprising a pusher arranged to move across the support to push cigarettes therefrom.

4. Apparatus as claimed in claim 3, comprising a carriage on which the said rear wall is mounted, said carriage being movable in directions transverse to and lengthwise of the direction of movement of said support.

5. Apparatus as claimed in claim 4, comprising automatic driving means to reciprocate the support, and means automatically operative, in timed relationship with said driving means to reciprocate the said pusher and to move the said carriage in said directions.

6. Apparatus as claimed in claim 1, wherein the said guide is forked and the rear wall is slotted to enable the rear wall to pass the guide.

7. Apparatus for collecting cigarettes, comprising a support movable lengthwise beneath a collecting station which includes a fixed guide whereby cigarettes are guided downwardly on to said support, a front wall movable with the support, a rear wall mounted independently of the support, the said rear wall and fixed guide being so shaped that the rear wall can pass the guide while moving forwardly with the support, means to move the support and front wall forwardly while feeding cigarettes on to the support from the collecting station until the rear wall has passed the guide and cigarettes are confined on the support between the front wall and the guide and also between the rear wall and the guide, means to remove only those cigarettes confined between the front wall and the guide, and means operative thereafter to move the front wall rearwardly close to the rear wall, and to move the rear wall away from the support transversely thereof and to replace it behind the guide, whereby the cigarettes remaining on the support are confined between the front wall and the guide, the support and front wall being arranged then to move forwardly in a fresh cycle of operations.

References Cited in the file of this patent

UNITED STATES PATENTS 2,354,040 Molins et al. ............ July 18, 1954